(12) United States Patent
Liu et al.

(10) Patent No.: US 9,565,125 B2
(45) Date of Patent: Feb. 7, 2017

(54) MULTICAST TO UNICAST CONVERSION TECHNIQUE

(71) Applicant: Aerohive Networks, Inc., Sunnyvale, CA (US)

(72) Inventors: Liwu Liu, Cupertino, CA (US); Jianlin Zeng, San Jose, CA (US)

(73) Assignee: Aerohive Networks, Inc., Milpitas, CA (US)

( * ) Notice: Subject to any disclaimer, the term of this patent is extended or adjusted under 35 U.S.C. 154(b) by 0 days.

(21) Appl. No.: 14/645,184

(22) Filed: Mar. 11, 2015

(65) Prior Publication Data

US 2015/0188836 A1 Jul. 2, 2015

Related U.S. Application Data

(63) Continuation of application No. 14/314,893, filed on Jun. 25, 2014, now Pat. No. 9,008,089, which is a
(Continued)

(51) Int. Cl.
*H04L 12/863* (2013.01)
*H04L 12/931* (2013.01)
(Continued)

(52) U.S. Cl.
CPC ....... *H04L 47/6295* (2013.01); *H04L 12/1881* (2013.01); *H04L 12/1886* (2013.01);
(Continued)

(58) Field of Classification Search
None
See application file for complete search history.

(56) References Cited

U.S. PATENT DOCUMENTS 5,471,671 A 11/1995 Wang et al.
5,697,059 A 12/1997 Carney
(Continued)

FOREIGN PATENT DOCUMENTS

EP 0940999 9/1999
EP 1732276 12/2006
(Continued)

OTHER PUBLICATIONS

Chirumamilla, Mohan K. et al., "Agent Based Intrustion Detection and Response System for Wireless LANs," CSE Conference and Workshop Papers, Paper 64, Jan. 1, 2003.
(Continued)

*Primary Examiner* — Diane Lo
(74) *Attorney, Agent, or Firm* — Sheppard, Mullin, Richter & Hampton LLP

(57) ABSTRACT

A technique allows stations to utilize an equal share of resources (e.g., airtime or throughput). This prevents slow stations from consuming too many resources (e.g., using up too much air time). Fairness is ensured by selective dropping after a multicast packet is converted to unicast. This prevents slow stations from using more than their share of buffer resources. Multicast conversion aware back-pressure into the network layer can be used to prevent unnecessary dropping of packets after multicast to unicast (1:n) conversion by considering duplicated transmit buffers. This technique helps achieve airtime/resource fairness among stations.

21 Claims, 5 Drawing Sheets

Related U.S. Application Data continuation of application No. 13/646,547, filed on Oct. 5, 2012, now Pat. No. 8,787,375.

(60) Provisional application No. 61/659,902, filed on Jun. 14, 2012.

(51) Int. Cl.

| | | |
|---|---|---|
| *H04L 12/867* | (2013.01) | |
| *H04L 12/835* | (2013.01) | |
| *H04L 12/823* | (2013.01) | |
| *H04L 29/06* | (2006.01) | |
| *H04L 12/18* | (2006.01) | |
| *H04L 12/819* | (2013.01) | |
| *H04L 12/873* | (2013.01) | |
| *H04L 12/801* | (2013.01) | |
| *H04W 4/06* | (2009.01) | |
| *H04W 28/14* | (2009.01) | |

(52) U.S. Cl.
CPC ............ *H04L 47/215* (2013.01); *H04L 47/30* (2013.01); *H04L 47/32* (2013.01); *H04L 47/527* (2013.01); *H04L 47/621* (2013.01); *H04L 47/629* (2013.01); *H04L 47/6215* (2013.01); *H04L 49/201* (2013.01); *H04L 65/4076* (2013.01); *H04L 65/80* (2013.01); *H04L 69/08* (2013.01); *H04W 4/06* (2013.01); *H04W 28/14* (2013.01); *H04L 47/15* (2013.01)

(56) References Cited

U.S. PATENT DOCUMENTS

| | | |
|---|---|---|
| 5,726,984 A | 3/1998 | Kubler et al. |
| 5,956,643 A | 9/1999 | Benveniste |
| 6,061,799 A | 5/2000 | Eldridge et al. |
| 6,112,092 A | 8/2000 | Benveniste |
| 6,154,655 A | 11/2000 | Borst et al. |
| 6,201,792 B1 | 3/2001 | Lahat |
| 6,314,294 B1 | 11/2001 | Benveniste |
| 6,473,413 B1 | 10/2002 | Chiou et al. |
| 6,496,699 B2 | 12/2002 | Benveniste |
| 6,519,461 B1 | 2/2003 | Andersson et al. |
| 6,628,623 B1 | 9/2003 | Noy |
| 6,628,938 B1 | 9/2003 | Rachabathuni et al. |
| 6,775,549 B2 | 8/2004 | Benveniste |
| 6,865,393 B1 | 3/2005 | Baum et al. |
| 7,002,943 B2 | 2/2006 | Bhagwat et al. |
| 7,057,566 B2 | 6/2006 | Theobold |
| 7,085,224 B1 | 8/2006 | Oran |
| 7,085,241 B1 | 8/2006 | O'Neill et al. |
| 7,154,874 B2 | 12/2006 | Bhagwat et al. |
| 7,164,667 B2 | 1/2007 | Rayment et al. |
| 7,174,170 B2 | 2/2007 | Steer et al. |
| 7,177,646 B2 | 2/2007 | O'Neill et al. |
| 7,181,530 B1 | 2/2007 | Halasz et al. |
| 7,216,365 B2 | 5/2007 | Bhagwat et al. |
| 7,224,697 B2 | 5/2007 | Banerjea et al. |
| 7,251,238 B2 | 7/2007 | Joshi et al. |
| 7,336,670 B1 | 2/2008 | Calhoun |
| 7,339,914 B2 | 3/2008 | Bhagwat et al. |
| 7,346,338 B1 | 3/2008 | Calhoun et al. |
| 7,366,894 B1 | 4/2008 | Kalimuthu et al. |
| 7,370,362 B2 | 5/2008 | Olson et al. |
| 7,440,434 B2 | 10/2008 | Chaskar et al. |
| 7,512,379 B2 | 3/2009 | Nguyen |
| 7,536,723 B1 | 5/2009 | Bhagwat et al. |
| 7,562,384 B1 | 7/2009 | Huang |
| 7,656,822 B1 | 2/2010 | AbdelAziz et al. |
| 7,706,789 B2 | 4/2010 | Qi et al. |
| 7,716,370 B1 | 5/2010 | Devarapalli |
| 7,751,393 B2 | 7/2010 | Chaskar et al. |
| 7,768,952 B2 | 8/2010 | Lee |
| 7,793,104 B2 | 9/2010 | Zheng et al. |
| 7,804,808 B2 | 9/2010 | Bhagwat et al. |
| 7,843,907 B1 | 11/2010 | Abou-Emara et al. |
| 7,844,057 B2 | 11/2010 | Meier et al. |
| 7,856,209 B1 | 12/2010 | Rawat |
| 7,921,185 B2 | 4/2011 | Chawla et al. |
| 7,949,342 B2 | 5/2011 | Cuffaro et al. |
| 7,961,725 B2 | 6/2011 | Nagarajan et al. |
| 7,970,894 B1 | 6/2011 | Patwardhan |
| 8,000,308 B2 | 8/2011 | Dietrich et al. |
| 8,219,688 B2 | 7/2012 | Wang |
| 8,249,606 B1 | 8/2012 | Neophytou et al. |
| 8,493,918 B2 | 7/2013 | Karaoguz et al. |
| 8,789,191 B2 | 7/2014 | Bhagwat et al. |
| 8,824,448 B1 | 9/2014 | Narayana et al. |
| 8,948,046 B2 | 2/2015 | Kang et al. |
| 9,003,527 B2 | 4/2015 | Bhagwat et al. |
| 2001/0006508 A1 | 7/2001 | Pankaj et al. |
| 2002/0012320 A1 | 1/2002 | Ogier et al. |
| 2002/0021689 A1 | 2/2002 | Robbins et al. |
| 2002/0071422 A1 | 6/2002 | Amicangioli |
| 2002/0091813 A1 | 7/2002 | Lamberton et al. |
| 2002/0116463 A1 | 8/2002 | Hart |
| 2002/0128984 A1 | 9/2002 | Mehta et al. |
| 2003/0005100 A1 | 1/2003 | Barnard et al. |
| 2003/0039212 A1 | 2/2003 | Lloyd et al. |
| 2003/0087629 A1 | 5/2003 | Juitt |
| 2003/0104814 A1 | 6/2003 | Gwon et al. |
| 2003/0129988 A1 | 7/2003 | Lee et al. |
| 2003/0145091 A1 | 7/2003 | Peng et al. |
| 2003/0179742 A1 | 9/2003 | Ogier et al. |
| 2004/0003285 A1 | 1/2004 | Whelan et al. |
| 2004/0013118 A1 | 1/2004 | Borella |
| 2004/0022222 A1 | 2/2004 | Clisham |
| 2004/0054774 A1 | 3/2004 | Barber et al. |
| 2004/0064467 A1 | 4/2004 | Kola et al. |
| 2004/0077341 A1 | 4/2004 | Chandranmenon et al. |
| 2004/0103282 A1 | 5/2004 | Meier et al. |
| 2004/0109466 A1 | 6/2004 | Van Ackere et al. |
| 2004/0162037 A1 | 8/2004 | Shpak |
| 2004/0185876 A1 | 9/2004 | Groenendaal et al. |
| 2004/0192312 A1 | 9/2004 | Li et al. |
| 2004/0196977 A1 | 10/2004 | Johnson et al. |
| 2004/0236939 A1 | 11/2004 | Watanabe et al. |
| 2004/0255028 A1 | 12/2004 | Chu et al. |
| 2005/0053003 A1 | 3/2005 | Cain et al. |
| 2005/0074015 A1 | 4/2005 | Chari et al. |
| 2005/0099983 A1 | 5/2005 | Nakamura et al. |
| 2005/0122946 A1 | 6/2005 | Won |
| 2005/0154774 A1 | 7/2005 | Giaffreda et al. |
| 2005/0207417 A1 | 9/2005 | Ogawa et al. |
| 2005/0262266 A1 | 11/2005 | Wiberg et al. |
| 2005/0266848 A1 | 12/2005 | Kim |
| 2006/0013179 A1 | 1/2006 | Yamane |
| 2006/0026289 A1 | 2/2006 | Lyndersay et al. |
| 2006/0062250 A1 | 3/2006 | Payne, III |
| 2006/0107050 A1 | 5/2006 | Shih |
| 2006/0117018 A1 | 6/2006 | Christiansen et al. |
| 2006/0140123 A1 | 6/2006 | Conner et al. |
| 2006/0146748 A1 | 7/2006 | Ng et al. |
| 2006/0146846 A1 | 7/2006 | Yarvis et al. |
| 2006/0165015 A1 | 7/2006 | Melick et al. |
| 2006/0187949 A1 | 8/2006 | Seshan et al. |
| 2006/0221920 A1 | 10/2006 | Gopalakrishnan et al. |
| 2006/0233128 A1 | 10/2006 | Sood et al. |
| 2006/0234701 A1 | 10/2006 | Wang et al. |
| 2006/0245442 A1 | 11/2006 | Srikrishna et al. |
| 2006/0268802 A1 | 11/2006 | Faccin |
| 2006/0294246 A1 | 12/2006 | Stieglitz et al. |
| 2007/0004394 A1 | 1/2007 | Chu et al. |
| 2007/0010231 A1 | 1/2007 | Du |
| 2007/0025274 A1 | 2/2007 | Rahman et al. |
| 2007/0025298 A1 | 2/2007 | Jung |
| 2007/0077937 A1 | 4/2007 | Ramakrishnan et al. |
| 2007/0078663 A1 | 4/2007 | Grace |
| 2007/0082656 A1 | 4/2007 | Stieglitz et al. |
| 2007/0087756 A1 | 4/2007 | Hoffberg |
| 2007/0091859 A1 | 4/2007 | Sethi et al. |
| 2007/0115847 A1 | 5/2007 | Strutt et al. |
| 2007/0116011 A1 | 5/2007 | Lim et al. |

(56) References Cited

U.S. PATENT DOCUMENTS

| | | |
|---|---|---|
| 2007/0121947 A1 | 5/2007 | Sood et al. |
| 2007/0133407 A1 | 6/2007 | Choi et al. |
| 2007/0140191 A1 | 6/2007 | Kojima |
| 2007/0153741 A1 | 7/2007 | Blanchette et al. |
| 2007/0156804 A1 | 7/2007 | Mo |
| 2007/0171885 A1 | 7/2007 | Bhagwat et al. |
| 2007/0192862 A1 | 8/2007 | Vermeulen et al. |
| 2007/0249324 A1 | 10/2007 | Jou et al. |
| 2007/0263532 A1 | 11/2007 | Mirtorabi et al. |
| 2007/0280481 A1 | 12/2007 | Eastlake et al. |
| 2007/0288997 A1 | 12/2007 | Meier et al. |
| 2008/0002642 A1 | 1/2008 | Borkar et al. |
| 2008/0022392 A1 | 1/2008 | Karpati et al. |
| 2008/0037552 A1 | 2/2008 | Dos Remedios et al. |
| 2008/0080369 A1 | 4/2008 | Sumioka |
| 2008/0080377 A1 | 4/2008 | Sasaki et al. |
| 2008/0090575 A1 | 4/2008 | Barak et al. |
| 2008/0095094 A1 | 4/2008 | Innami |
| 2008/0107027 A1 | 5/2008 | Allan et al. |
| 2008/0109879 A1 | 5/2008 | Bhagwat et al. |
| 2008/0130495 A1 | 6/2008 | Dos Remedios et al. |
| 2008/0146240 A1 | 6/2008 | Trudeau |
| 2008/0170527 A1 | 7/2008 | Lundsgaard et al. |
| 2008/0207215 A1 | 8/2008 | Chu et al. |
| 2008/0225857 A1 | 9/2008 | Lange |
| 2008/0229095 A1 | 9/2008 | Kalimuthu et al. |
| 2008/0240128 A1 | 10/2008 | Elrod |
| 2008/0253370 A1 | 10/2008 | Cremin et al. |
| 2008/0273520 A1 | 11/2008 | Kim et al. |
| 2008/0279161 A1 | 11/2008 | Stirbu et al. |
| 2009/0019521 A1 | 1/2009 | Vasudevan |
| 2009/0028052 A1 | 1/2009 | Strater et al. |
| 2009/0040989 A1 | 2/2009 | da Costa et al. |
| 2009/0043901 A1 | 2/2009 | Mizikovsky et al. |
| 2009/0082025 A1 | 3/2009 | Song |
| 2009/0088152 A1 | 4/2009 | Orlassino |
| 2009/0097436 A1 | 4/2009 | Vasudevan et al. |
| 2009/0111468 A1 | 4/2009 | Burgess et al. |
| 2009/0113018 A1 | 4/2009 | Thomson et al. |
| 2009/0141692 A1 | 6/2009 | Kasslin et al. |
| 2009/0144740 A1 | 6/2009 | Gao |
| 2009/0168645 A1 | 7/2009 | Tester et al. |
| 2009/0172151 A1 | 7/2009 | Davis |
| 2009/0239531 A1 | 9/2009 | Andreasen et al. |
| 2009/0240789 A1 | 9/2009 | Dandabany |
| 2009/0247170 A1 | 10/2009 | Balasubramanian et al. |
| 2009/0310557 A1 | 12/2009 | Shinozaki |
| 2010/0046368 A1* | 2/2010 | Kaempfer ............... H04L 47/10 370/231 |
| 2010/0057930 A1 | 3/2010 | DeHaan |
| 2010/0067379 A1 | 3/2010 | Zhao et al. |
| 2010/0112540 A1 | 5/2010 | Gross et al. |
| 2010/0115576 A1 | 5/2010 | Hale et al. |
| 2010/0132040 A1 | 5/2010 | Bhagwat et al. |
| 2010/0208614 A1 | 8/2010 | Harmatos |
| 2010/0228843 A1 | 9/2010 | Ok et al. |
| 2010/0240313 A1 | 9/2010 | Kawai |
| 2010/0254316 A1 | 10/2010 | Sendrowicz |
| 2010/0260091 A1 | 10/2010 | Seok |
| 2010/0290397 A1 | 11/2010 | Narayana et al. |
| 2010/0304738 A1 | 12/2010 | Lim et al. |
| 2010/0311420 A1 | 12/2010 | Reza et al. |
| 2010/0322217 A1 | 12/2010 | Jin et al. |
| 2010/0325720 A1 | 12/2010 | Etchegoyen |
| 2011/0004913 A1 | 1/2011 | Nagarajan et al. |
| 2011/0040867 A1 | 2/2011 | Kalbag |
| 2011/0051677 A1 | 3/2011 | Jetcheva et al. |
| 2011/0055326 A1 | 3/2011 | Michaelis et al. |
| 2011/0055928 A1 | 3/2011 | Brindza |
| 2011/0058524 A1 | 3/2011 | Hart et al. |
| 2011/0064065 A1 | 3/2011 | Nakajima et al. |
| 2011/0182225 A1 | 7/2011 | Song et al. |
| 2011/0185231 A1 | 7/2011 | Balestrieri et al. |
| 2011/0258641 A1 | 10/2011 | Armstrong et al. |
| 2012/0014386 A1 | 1/2012 | Xiong et al. |
| 2012/0290650 A1 | 11/2012 | Montuno et al. |
| 2013/0003729 A1 | 1/2013 | Raman et al. |
| 2013/0003739 A1 | 1/2013 | Raman et al. |
| 2013/0028158 A1 | 1/2013 | Lee et al. |
| 2013/0059570 A1 | 3/2013 | Hara et al. |
| 2013/0086403 A1 | 4/2013 | Jenne et al. |
| 2013/0103833 A1 | 4/2013 | Ringland et al. |
| 2013/0250811 A1 | 9/2013 | Vasseur et al. |
| 2014/0269327 A1 | 9/2014 | Fulknier et al. |
| 2014/0298467 A1 | 10/2014 | Bhagwat et al. |
| 2015/0120864 A1 | 4/2015 | Unnimadhavan et al. |

FOREIGN PATENT DOCUMENTS

| | | |
|---|---|---|
| EP | 1771026 | 4/2007 |
| EP | 1490773 | 1/2013 |
| WO | 0059251 | 10/2000 |
| WO | 2004042971 | 5/2004 |
| WO | 2006129287 | 12/2006 |
| WO | 2009141016 | 11/2009 |

OTHER PUBLICATIONS

Craiger, J. Philip, "802.11, 802.1x, and Wireless Security," SANS Institute InfoSec Reading Room, Jun. 23, 2002.

Finlayson, Ross et al., "A Reverse Address Resolution Protocol," Nework Working Group, Request for Comments: 903 (RFC 903), Jun. 1984.

Clausen, T., et al., "Optimized Link State Routing Protocol (OLSR)," Network Working Group, pp. 1-71, Oct. 2003.

He, Changhua et al., "Analysis of the 802.11i 4-Way Handshake," Proceedings of the 3rd ACM Workshop on Wireless Security, pp. 43-50, Oct. 2004.

Lee, Jae Woo et al, "z2z: Discovering Zeroconf Services Beyond Local Link," 2007 IEEE Globecom Workshops, pp. 1-7, Nov. 26, 2007.

Perkins, C., et al., "Ad hoc On-Demand Distance Vector (AODV) Routing," Network Working Group, pp. 1-35, Oct. 2003.

International Application No. PCT/US2008/061674, International Search Report and Written Opinion mailed Oct. 14, 2008.

International Application No. PCT/US2011/047591, International Search Report and Written Opinion mailed Dec. 19, 2011.

International Application No. PCT/US2012/059093, International Search Report and Written Opinion mailed Jan. 4, 2013.

Nu, Haitao et al., "Layer 2.5 SoftMAC: End-System Based Media Streaming Support on Home Networks," IEEE Global Telecommunications Conference (GLOBECOM '05), vol. 1, pp. 235-239, Nov. 2005.

European Patent Application No. 12879114.2, Search Report mailed Jan. 21, 2016.

European Patent Application No. 11823931.8, Search Report mailed Aug. 29, 2016.

* cited by examiner

MULTICAST TO UNICAST CONVERSION TECHNIQUE

CROSS REFERENCE TO RELATED APPLICATIONS

This application is a continuation of U.S. Ser. No. 14/314,893, filed Jun. 25, 2014; entitled "MULTICAST TO UNICAST CONVERSION TECHNIQUE", which is a continuation of U.S. Ser. No. 13/646,547, filed Oct. 5, 2012, now U.S. Pat. No. 8,787,375; entitled "MULTICAST TO UNICAST CONVERSION TECHNIQUE," which claims priority to U.S. Ser. No. 61/659,902, filed Jun. 14, 2012, entitled "MULTICAST TO UNICAST CONVERSION TECHNIQUE," all of which are incorporated by reference.

BACKGROUND

An area of ongoing research and development is in improving performance of communication over a network, and in particular a wireless network. Wireless networks are frequently governed by 802.11 standards. While not all networks need to use all of the standards associated with 802.11, a discussion of the standards by name (e.g., discussion of the 802.11n) provides a useful context in which to describe issues as they relate to wireless systems, at least partly because the standards are well-known and documented, Performance improvements can include improving one aspect of network communications at the expense of another. Trade-offs between packet types, classes of users, etc., are generally considered an implementation-specific issue. For shared communications, such as multicast video, it may be desirable to sacrifice the performance at a particular network client in favor of other network clients, or ensure that the treatment of various network clients is fair given the capabilities of their stations. Improving overall performance of a group and ensuring fairness have been goals that have not yet been perfectly met.

The foregoing examples of the related art and limitations related therewith are intended to be illustrative and not exclusive. For Example, wireless clients may use different protocols other than 802.11, potentially including protocols that have not yet been developed. However, problems associated with performance may persist. Other limitations of the relevant art will become apparent to those of skill in the art upon a reading of the specification and a study of the drawings.

SUMMARY

The following embodiments and aspects thereof are described and illustrated in conjunction with systems, tools, and methods that are meant to be exemplary and illustrative, not necessarily limiting in scope. In various embodiments, one or more of the above-described problems have been addressed, while other embodiments are directed to other improvements.

A technique for improved performance on a network involves converting multicast packets to unicast packets. It is known that some stations take much longer to transmit than others. Slow stations can easily use up transmit buffer resources, resulting in back pressure to a network layer and degraded traffic quality to fast stations. To ensure fairness, each station is allowed to utilize an equal share of resources (e.g., airtime or throughput). This prevents slow stations from consuming too many resources (e.g., using up too much air time). Fairness is ensured by selective dropping after a multicast packet is converted to unicast. This prevents slow stations from using more than their share of buffer resources. Moreover, multicast conversion aware back-pressure into the network layer can be used to prevent unnecessary dropping of packets after multicast to unicast (1:n) conversion by considering duplicated transmit buffers. Advantageously, this technique helps achieve airtime/resource fairness among stations, for example, receiving a shared multicast transmission.

These and other advantages will become apparent to those skilled in the relevant art upon a reading of the following descriptions and a study of the several examples of the drawings.

DETAILED DESCRIPTION

Figure 1:
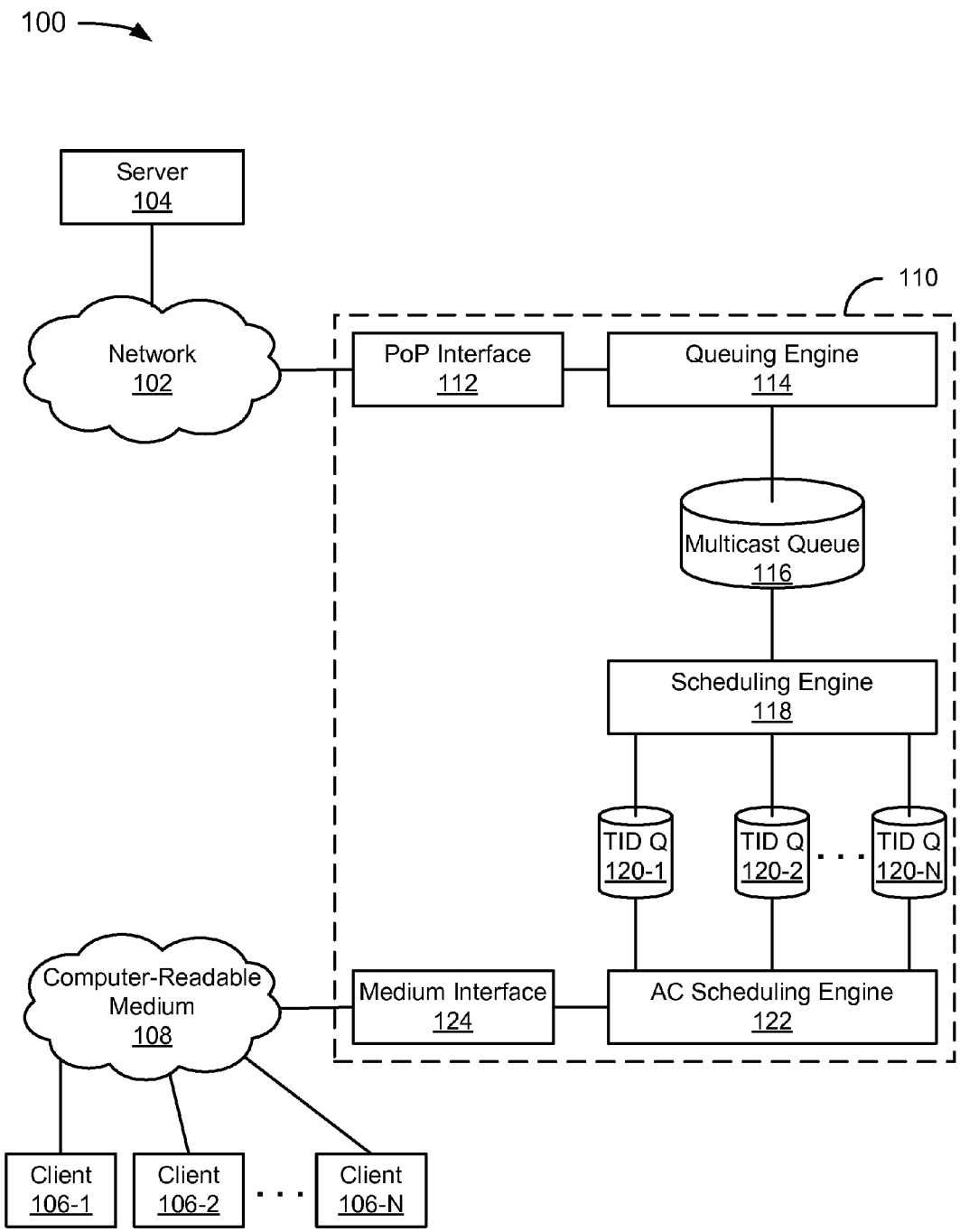
FIG. 1 depicts a diagram of an example of a back-pressure sensitive multicast to unicast conversion system.

FIG. 1 depicts a diagram 100 of an example of a back-pressure sensitive multicast to unicast conversion system. In the example of FIG. 1, the diagram 100 includes a network 102, a server 104, clients 106-1 to 106-N (collectively referred to as clients 106), a computer-readable medium 108, and a multicast-to-unicast conversion, high session performance system 110.

In the example of FIG. 1, the network 102 may be practically any type of communications network, such as the Internet or an infrastructure network. The term "Internet" as used in this paper refers to a network of networks that use certain protocols, such as the TCP/IP protocol, and possibly other protocols, such as the hypertext transfer protocol (HTTP) for hypertext markup language (HTML) documents that make up the World Wide Web ("the web"). More generally, the network 102 can include, for example, a wide area network (WAN), metropolitan area network (MAN), campus area network (CAN), or local area network (LAN), but the network 102 could at least theoretically be of any size or characterized in some other fashion (e.g., personal area network (PAN) or home area network (HAN), to name a couple of alternatives). Networks can include enterprise private networks and virtual private networks (collectively, private networks). As the name suggests, private networks are under the control of a single entity. Private networks can include a head office and optional regional offices (collectively, offices). Many offices enable remote users to connect to the private network offices via some other network, such as the Internet. The example of FIG. 1 is intended to illustrate a network 102 that may or may not include more than one private network.

In the example of FIG. 1, the server 104 is coupled to the network 102. The server 104, and more generally any device connected to a network, can be referred to as "on" the network. For illustrative purposes, the server 104 is described in this example as serving content. Accordingly, in this example, the server 104 can be referred to as a content server. A web server, which is one type of content server, is typically at least one computer system that operates as a server computer system and is configured to operate with the protocols of the World Wide Web and is coupled to the Internet. Unless context dictates otherwise, a server as used in this paper includes at least a portion of a computer system running server software.

A computer system, as used in this paper, is intended to be construed broadly. In general, a computer system will include a processor, memory, non-volatile storage, and an interface. A typical computer system will usually include at least a processor, memory, and a device (e.g., a bus) coupling the memory to the processor.

The processor can be, for example, a general-purpose central processing unit (CPU), such as a microprocessor, or a special-purpose processor, such as a microcontroller.

The memory can include, by way of example but not limitation, random access memory (RAM), such as dynamic RAM (DRAM) and static RAM (SRAM). The memory can be local, remote, or distributed. As used in this paper, the term "computer-readable storage medium" is intended to include only physical media, such as memory. As used in this paper, a computer-readable medium is intended to include all mediums that are statutory (e.g., in the United States, under 35 U.S.C. 101), and to specifically exclude all mediums that are non-statutory in nature to the extent that the exclusion is necessary for a claim that includes the computer-readable medium to be valid. Known statutory computer-readable mediums include hardware (e.g., registers, random access memory (RAM), non-volatile (NV) storage, to name a few), but may or may not be limited to hardware.

The bus can also couple the processor to the non-volatile storage. The non-volatile storage is often a magnetic floppy or hard disk, a magnetic-optical disk, an optical disk, a read-only memory (ROM), such as a CD-ROM, EPROM, or EEPROM, a magnetic or optical card, or another form of storage for large amounts of data. Some of this data is often written, by a direct memory access process, into memory during execution of software on the computer system. The non-volatile storage can be local, remote, or distributed. The non-volatile storage is optional because systems can be created with all applicable data available in memory.

Software is typically stored in the non-volatile storage. Indeed, for large programs, it may not even be possible to store the entire program in the memory. Nevertheless, it should be understood that for software to run, if necessary, it is moved to a computer-readable location appropriate for processing, and for illustrative purposes, that location is referred to as the memory in this paper. Even when software is moved to the memory for execution, the processor will typically make use of hardware registers to store values associated with the software, and local cache that, ideally, serves to speed up execution. As used herein, a software program is assumed to be stored at any known or convenient location (from non-volatile storage to hardware registers) when the software program is referred to as "implemented in a computer-readable storage medium." A processor is considered to be "configured to execute a program" when at least one value associated with the program is stored in a register readable by the processor.

In one example of operation, a computer system can be controlled by operating system software, which is a software program that includes a file management system, such as a disk operating system. One example of operating system software with associated file management system software is the family of operating systems known as Windows® from Microsoft Corporation of Redmond, Wash., and their associated file management systems. Another example of operating system software with its associated file management system software is the Linux operating system and its associated file management system. The file management system is typically stored in the non-volatile storage and causes the processor to execute the various acts required by the operating system to input and output data and to store data in the memory, including storing files on the non-volatile storage.

The bus can also couple the processor to the interface. The interface can include one or more input and/or output (I/O) devices. The I/O devices can include, by way of example but not limitation, a keyboard, a mouse or other pointing device, disk drives, printers, a scanner, and other I/O devices, including a display device. The display device can include, by way of example but not limitation, a cathode ray tube (CRT), liquid crystal display (LCD), or some other applicable known or convenient display device. The interface can include one or more of a modem or network interface. It will be appreciated that a modem or network interface can be considered to be part of the computer system. The interface can include an analog modem, isdn modem, cable modem, token ring interface, satellite transmission interface (e.g. "direct PC"), or other interfaces for coupling a computer system to other computer systems. Interfaces enable computer systems and other devices to be coupled together in a network.

In the example of FIG. 1, the server 104 serves content to the clients 106. In this example, the server-client relationship between the server 104 and the clients 106 is that of content server to content consumer. A device that includes a client 106-1 can also include a client of some other server or include a server for some other client. For example, in a wireless context, the device can include a wireless client and be associated with a wireless network, such as a wireless LAN (WLAN).

In a wireless communications context, the clients 106 can be referred to as stations. A station, as used in this paper, may be referred to as a device with a media access control (MAC) address and a physical layer (PHY) interface to a wireless medium that complies with the IEEE 802.11 standard. Thus, for example, the stations 106 and a wireless access point (WAP) with which the stations 106 associate can be referred to as stations, if applicable. IEEE 802.11a-1999, IEEE 802.11b-1999, IEEE 802.11g-2003, IEEE 802.11-2007, and IEEE 802.11n TGn Draft 8.0 (2009) are incorporated by reference. As used in this paper, a system that is 802.11 standards-compatible or 802.11 standards-compliant complies with at least some of one or more of the incorporated documents' requirements and/or recommendations, or requirements and/or recommendations from earlier drafts of the documents, and includes Wi-Fi systems. Wi-Fi is a non-technical description that is generally correlated with the IEEE 802.11 standards, as well as Wi-Fi Protected Access (WPA) and WPA2 security standards, and the Extensible Authentication Protocol (EAP) standard. In alternative embodiments, a station may comply with a different standard than Wi-Fi or IEEE 802.11, may be referred to as something other than a "station," and may have different interfaces to a wireless or other medium.

In the example of FIG. 1, the computer-readable medium 108 is coupled to the clients 106. In a wireless communications context, the computer-readable medium 108 can include a WLAN. In a wired communications context, the computer-readable medium 108 can include a wired network. The computer-readable medium 108 can include wired and wireless networks. It is likely that the computer-readable medium 108 would be referred to as a "network" in some implementations, but it is not a requirement.

In the example of FIG. 1, the network 102 and the computer-readable medium 108 are coupled together via the multicast-to-unicast conversion, high session performance system 110. Conceptually, the server 104, the clients 106, and the multicast-to-unicast conversion, high session performance system 110 can be on a network that comprises the network 102 and the computer readable medium 108, though in this example communications are described as passing from the server 104 through the multicast-to-unicast conversion, high session performance system 110 to the clients 106. (The network 102 and the computer-readable medium 108 can also be coupled together via some other redundant channel.)

In the example of FIG. 1, the multicast-to-unicast conversion, high session performance system 110 includes a point of presence (PoP) interface 112, a queuing engine 114, a multicast queue 116, a scheduling engine 118, traffic identifier (TID) queues 120-1 to 120-N (collectively referred to as TID queues 120), an access category (AC) scheduling engine 122, and a medium interface 124. The system 110 receives downlink traffic from the network 102 and puts the downlink traffic onto the computer-readable medium 108 (the source of the downlink traffic is the server 104 and the destination is one or more of the clients 106). Thus, in this paper, downlink network traffic refers to network traffic directed toward one or more of the clients 106. Uplink traffic, on the other hand, refers to network traffic received from one or more of the clients 106. Downlink traffic is directed to one of more of the clients 106 in direct or indirect communication with the system 110 via a wireless network connection. The system 110 may be adapted to communicate the packet directly to one or more of the clients 106 via a wired or wireless network connection (depending upon the nature of the computer-readable medium 108) and/or to other network devices, which in turn communicate the packet to one or more of the clients 106 via a wired or wireless network connection.

In the example of FIG. 1, the PoP interface 112 is intended to represent an engine that enables the system 110 to communicate with the network 102. The term "PoP" is frequently used with reference to an access point to the Internet, but is used more broadly in this paper to include an access point to the network 102. In addition to or as part of the PoP interface 112, the system 110 can include servers, routers, ATM switches, digital/analog call aggregators, etc. that are conceptually part of a PoP associated with the PoP interface 112 on the network 102. The PoP interface 112 can be part of the facilities of a telecommunications provider that an Internet service provider (ISP) rents or a location separate from a telecommunications provider. In this paper, the PoP interface 112 is considered to include the components of the system 110 that are under the control of a party that provides access to the network 102 or a service thereof; the party can be referred to as a network service provider (NSP) which is a superset of ISP.

In the example of FIG. 1, the PoP interface 112 is coupled to the queuing engine 114. In a specific implementation, the queuing engine 114 can be considered part of a network switch. A network switch includes a computer networking device that connects network segments, and can also include port mirroring, firewall, network intrusion detection, performance analysis, and other applicable known or convenient engines. A network switch can include a network bridge that processes and routes data in the data link layer (layer 2) of the OSI model. For example, an Ethernet switch operates at the data link layer. However, the network switch could be implemented as a multilayer switch that also processes data at the network layer (layer 3) and/or transport layer (layer 4). A network hub or repeater operates on the physical layer (layer 1) and typically receives data on a port of entry and broadcasts out on every port other than the port of entry. The network switch would not typically be a passive network device such as a hub, which falls outside of the definition of "network switch" as used in this paper, but within the definition of a "networking device" as used in this paper.

A network switch can be implemented in a converged device such as a gateway to access broadband services such as digital subscriber line (DSL) or cable internet. The converged device would typically include components that interface to the particular broadband technology, such as a protocol converter, and can include a telephone interface for voice over IP (VoIP). The term "broadband" is a relative term. For example, broadband Internet access is typically contrasted with dial-up access using a 56 k modem. In a specific implementation, the term broadband can be used to mean at least equivalent to a DSL, which is about 70 Mbps. For example, 70 Mbps could include 6 Mbps of Internet access, 30 Mbps of broadcast video, and 35 Mbps of switched digital video (give or take). In Ethernet provided over cable modem is a common alternative to DSL; and the term broadband should be interpreted to mean equivalent to that of 100BASE-T Ethernet, as well. In telecommunication, a very narrow band can carry Morse code, a narrow band will carry speech (voiceband), and a still broader band will carry real-time multimedia. Only the latter would normally be considered "broadband." However, it may be noted that a voice line could be converted to a non-laded twisted-pair wire (no telephone filters) to become hundreds of kilohertz wide (broadband) and can carry several Mbps. Thus, the term broadband in this paper should include equivalent to ADSL, which, depending upon the implemented standard can be from 2 Mpbs to 27.5 Mbps. As another example, digital signal 3 (DS3) is a digital signal level 3 T-carrier, also referred to as a T3 line, with a data rate of 44.736 Mpbs, which would be considered in the "broadband" range. Currently, a sophisticated consumer expectation for broadband range for Internet access would be perhaps 44 Mbps or higher, or perhaps approximately 70-100 Mbps, but it should be understood that the definition of broadband could change over time to include different, presumably higher, Mbps than those just described, and different consumer expectations.

In a specific implementation, the queuing engine 114 includes bridging functionality (and can be referred to as a "bridging and queuing engine"). Bridging often refers to transparent bridging or learning bridge operations. In Ethernet networks, bridging functionality is descriptive of a device that behaves according to the IEEE 802.1D standard. Another form of bridging, source route bridging, was developed for token ring networks. Other packet-switched networks can operate in accordance with other standards.

In a specific implementation, the queuing engine 114 includes classification functionality (and can be referred to as a "classification and queuing engine"). Classification functionality enables the identification of a kind of traffic in a traffic stream, such as audio or video. Traffic class can be used to indicate the kind of traffic in a traffic stream, such as audio or video. Quality of service (QoS) refers to control mechanisms that can provide different priority to different traffic classes, users, or data flows, or guarantee a certain level of performance to a data flow in accordance with requests from the application program.

In a specific implementation, the queuing engine 114 includes both bridging and classification functionality (and can be referred to as a "bridging, classification, and queuing engine").

In the example of FIG. 1, the queuing engine 114 is coupled to the multicast queue 116. The multicast queue 116 can be implemented as a buffer, such as a network DRAM buffer. In a specific implementation, the queuing engine 114 enqueues packets in the multicast queue 116. As used in this paper, unless context dictates otherwise, a packet includes a collection of data that can be referred to (typically depending upon the context and/or layer of ODI model considered), a datagram, frame, message, or some other type of network data package. For illustrative purposes, the packets include multicast packets, which are at some point converted to unicast. This is relevant due to the advantageous backpressure control offered by the techniques described in this paper (and the multicast queue 116 can be referred to as a "backpressure-controlled multicast queue"). The multicast queue 116 can be part of an indiscriminant queue for packets, or can be a physically or logically distinct queue from queues containing, e.g., unicast packets.

In the example of FIG. 1, the multicast queue 116 is coupled to the scheduling engine 118. In a specific implementation, the scheduling engine 118 includes a "dummy scheduler." In a Wi-Fi implementation, the scheduling engine 118 can perform IEEE 802.3-to-802.11 encapsulation. In a specific implementation, the scheduling engine 118 converts multicast packets in the multicast queue 116 into unicast packets.

In a specific implementation, the scheduling engine 118 is backpressure-aware in the network layer (and can be referred to as a "backpressure-aware scheduling engine"). In the context of this example, "backpressure" is descriptive of insufficient transmit buffers in a transmit subsystem (e.g., a Wi-Fi subsystem). The scheduling engine 118 avoids dropping packets, such as video packets, after multicast-to-unicast conversion by considering duplicated transmit buffers. In a specific implementation, this entails counting the number of duplicate unicast packets to be derived from the multicast packet per packet when considering transmit buffer requirements. For example, when the scheduling engine 118 schedules multicast packets, the scheduling engine 118 checks whether the transmit subsystem has enough buffers for each copy to be duplicated, as opposed to only checking one available buffer.

In a specific implementation, the scheduling engine 118 ensures buffer fairness (and can be referred to as an "ensured buffer fairness scheduling engine"). Buffer fairness is ensured by selective dropping after a multicast packet is converted to multiple unicast packets for multiple stations. Advantageously, this can prevent slow stations from using unfair amounts of buffer resources and from causing other stations to have limited buffer resources to utilize their assigned fair share of airtime; and can help to achieve airtime/throughput fairness among multiple stations, e.g., watching the same multicast video stream. TID identifies data packets as belonging to a unique traffic stream. Assuming packets are not dropped, the scheduling engine 118 enqueues multicast-to-unicast converted packets in the appropriate TID queues 120.

In operation, the scheduling engine 118 determines a QoS profile to be associated with a packet. (The AC scheduling engine 122 could alternatively or redundantly determine the QoS profile, or the scheduling engine 118 could share some portion of the determination with the AC scheduling engine 122.) QoS profiles can be assigned to packets based on source, destination, user identity or user class associated with source and/or destination, content or control data associated with the packet, source or client application, and/or data flow associated with the packet. In a specific implementation, the set of QoS profiles are specified by network administrators. Each QoS profile can be assigned a scheduling weight and a scheduling mode to facilitate prioritization of packets. In specific implementation, a QoS profile can be associated with a per-user rate limit.

In the example of FIG. 1, the scheduling engine 118 is coupled to the TID queues 120. In a specific implementation, the TID queues 120 are associated with respective traffic flows on a per-station, per-priority basis. In a multi-station IEEE 802.11n TID packet scheduling scheme, the TID queues 120 are compatible with IEEE 802.11n TID queues. In other implementations, the TID queues 120 may be compatible with some other protocol or go by some other name.

In the example of FIG. 1, the TID queues 120 are coupled to the AC scheduling engine 122. Wireless Multimedia Extensions, also known as Wi-Fi Multimedia (WMM), is a Wi-Fi Alliance interoperability certification, based on the IEEE 802.11e standard, that provides basic QoS features to IEEE 802.11 networks. WMM prioritizes traffic according to four ACs—voice, video, best effort, and background. In a Wi-Fi context, the AC scheduling engine 122 would schedule according to these four categories, but other standards may refer to categories by a name other than AC, and may have a different number of categories.

In a specific implementation, the AC scheduling engine 122 can replace a round-robin TID scheduling algorithm with an airtime fairness and/or throughput fairness scheduling algorithm, targeting each station to utilize equal share of either airtime or throughput. In such an implementation, the AC scheduling engine 122 is responsible for fairness-enforced TID to access category scheduling (and can be referred to as a "fairness-enforced TID to AC scheduling engine"). The enforced fairness can be with respect to airtime, for example preventing stations with low packet rates from using too much airtime. In an embodiment in which the AC scheduling engine 122 has the requisite capability, the AC scheduling engine 122 can be referred to as an "airtime fairness-enforced AC scheduling engine." The enforced fairness can be with respect to throughput, for example improving the overall throughput for majority stations with similar packet rates. In an embodiment in which the AC scheduling engine 122 has the requisite capability, the AC scheduling engine 122 can be referred to as a "throughput fairness-enforced AC scheduling engine." Alternatively, the AC scheduling engine can be referred to as an "airtime and throughput fairness-enforced AC scheduling engine," or "airtime or throughput fairness-enforced AC scheduling engine" (the former is considered to be a subset of the latter), if applicable. It may be noted that in some embodiments, the airtime and throughput fairness-enforced AC scheduling engine operates in either airtime fairness mode or throughput fairness mode, but not both at the same time for a particular domain.

In a specific implementation, the AC scheduling engine determines a cost for a packet in one or more of the TID queues 120. The cost to send the packet can be referred to as a "token cost." The token cost can be based on factors including, for example, an estimated airtime for the packet, the bandwidth required to send the package, the QoS profile, etc. The token cost represents an estimate or ratio of network resources consumed when sending the associated packet.

In an implementation in which the token cost is based at least in part on an estimated airtime, the estimate can be based on airtime required by previous packets to the same client, similar clients, and/or clients assigned to the same QoS profile. For example, a running average of airtime consumed by one or more most-recently sent packets to the same client may be used to determine at least a portion of estimated packet airtime for a currently received packet. In a specific implementation, the average airtime of recently sent packets can be weighted or divided by their respective packet sizes to determine an average airtime consumed per data unit, such as average airtime consumed per byte. This average airtime consumed per data unit can be scaled or weighted according the size of the received packet to determine at least a portion of the estimated airtime for the currently received packet, causing token cost to increase with packet size. The token cost or total estimated airtime may or may not include an estimated airtime for transmitting a packet to the client, the actual, estimated, or prorated airtime used for retransmitting packets that were previously unsuccessfully transmitted, and/or network overhead.

In a specific implementation, the AC scheduling engine 122 aggregates frames (and can be referred to as an "AC scheduling and frame aggregation engine"). In a specific implementation, the AC scheduling engine 122 performs airtime or throughput fairness-enforced TID to AC scheduling and aggregates frames (and can be referred to as an "airtime or throughput fairness-enforced TID to AC scheduling and frame aggregation engine").

In the example of FIG. 1, the access category aggregation engine 122 is coupled to the medium interface 124. In a Wi-Fi implementation, the medium interface 124 can include a Wi-Fi radio. In other implementations, applicable known or convenient components can be used to couple the system 110 to the computer-readable medium 108 in a wired or wireless fashion.

In the example of FIG. 1, in operation, the PoP interface 112 receives a multicast packet (typically an IP packet) from the network 102 that was sent from the server 104. The queuing engine 114 enqueues the multicast packet (typically after proper classification) on the multicast queue 116. The scheduling engine 118 dequeues the multicast packet and enqueues a unicast packet (typically with proper encapsulation) on each of the relevant TID queues 120, corresponding to the client 106 that is an intended recipient of the multicast packet. The access category aggregation engine 122 aggregates frames by access category and provides the frames to the medium interface 124 for placing on the computer-readable medium 108.

Figure 2:
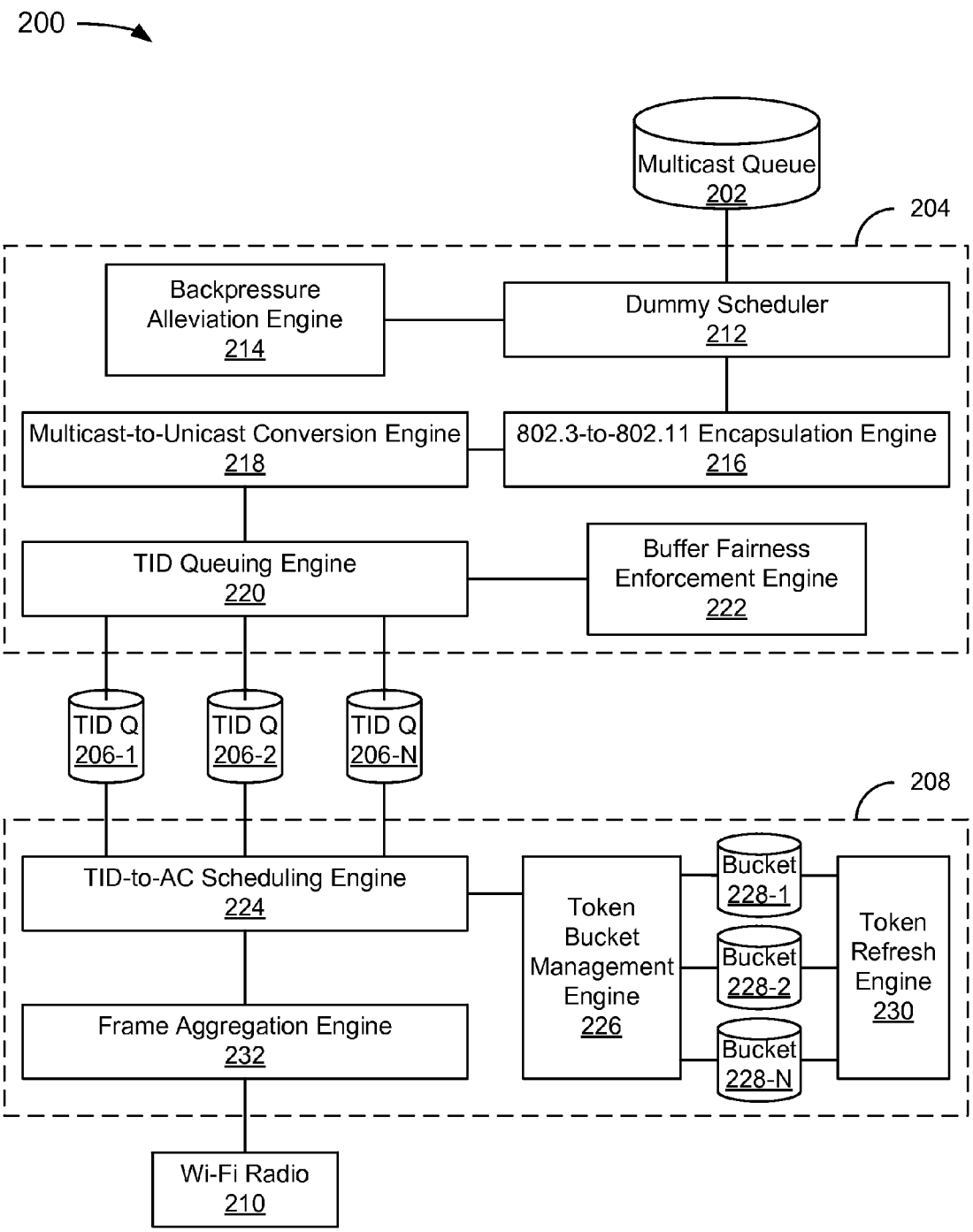
FIG. 2 depicts a diagram of an example of a system for providing airtime or throughput fairness-enforced QoS for multicast video in Wi-Fi.

FIG. 2 depicts a diagram 200 of an example of a system for providing airtime or throughput fairness-enforced QoS for multicast video in Wi-Fi. FIG. 2 is intended to illustrate techniques for ensuring fairness and performance in a system such as is illustrated in the example of FIG. 1. The diagram 200 is directed to Wi-Fi, but could be directed to other standards (or no standard) as well. The diagram 200 includes a multicast queue 202, a backpressure-sensitive scheduling engine 204, TID queues 206-1 to 206-N (referred to collectively as TID queues 206), an AC scheduling and frame aggregation engine 208, and a Wi-Fi Radio 210.

In the example of FIG. 2, the multicast queue 202 can be similar to the multicast queue 116 (FIG. 1). In a specific implementation, the multicast queue 202 is configured as a buffer to store multicast packets. The multicast queue 202 can be implemented as part of a queue that physically or logically includes unicast packets, but nevertheless can be referred to as a "multicast queue" because multicast packets, though perhaps interspersed with unicast packets, are still queued therein. In a specific implementation, the multicast packets include multicast video packets (and can be referred to as a "multicast video queue"). The multicast queue 202 can be implemented as part of a queue that physically or logically includes packets having ACs other than video, but nevertheless can be referred to as a "multicast video queue" because multicast video packets, though perhaps interspersed with multicast voice (or other AC) packets, are still queued therein.

In the example of FIG. 2, the backpressure-sensitive scheduling engine 204 can be similar to the scheduling engine 114 (FIG. 1). The backpressure-sensitive scheduling engine 204 includes a dummy scheduler 212, a backpressure alleviation engine 214, an 802.3-to-802.11 encapsulation engine 216, a multicast-to-unicast conversion engine 218, a TID queuing engine 220, and a buffer fairness enforcement engine 222. While the example of FIG. 2 makes explicit reference to certain standards, it should be understood that techniques described in association with this example may be applicable to other wireless or wired standards or to standard-less implementations.

In the example of FIG. 2, the dummy scheduler 212 is coupled to the multicast queue 202. The purpose of the dummy scheduler 212 is to dequeues packets from the multicast queue 202 in accordance with an implemented algorithm, schedule, or timer. The act of dequeuing packets from the multicast queue 202 frees up a network buffer. (It may be noted that the dummy scheduler could be implemented to mark a packet for processing, but freeing up the network buffer could occur later.)

In the example of FIG. 2, the backpressure alleviation engine 214 determines whether a multicast packet scheduled into Wi-Fi needs multiple copies of transmit buffers for the corresponding multicast-to-unicast converted packet. This enables the backpressure alleviation engine 214 to intelligently reduce backpressure that would otherwise prevent a network scheduler from scheduling packets into the Wi-Fi domain to avoid dropping packets in the Wi-Fi domain. The determination can include counting the number of multicast-to-unicast converted packets that will be derived from a multicast packet when considering transmit buffer requirements. In a specific implementation that includes video multicast packets, the backpressure alleviation engine 214 provides backpressure sensitivity to the network layer to prevent unnecessarily dropping packets after multicast-to-unicast conversion by considering the duplicated transmit buffers.

In a specific implementation, one aspect of airtime (or throughput) fairness-based scheduling is backpressure alleviation. The backpressure alleviation engine 214 can force clients of a network (e.g., a WLAN) to utilize equal shares of airtime (or throughput) at the network layer. This prevents stations with lower Wi-Fi packet rates to use too much airtime. For example, stations with low signal-to-noise ratio (SNR) take more airtime to transmit than stations with high SNR (the former can be referred to as "slow stations" and the latter can be referred to as "fast stations"). Slow stations use more airtime causing fast stations to potentially receive poor, e.g., video quality as their shares of airtime are squeezed. Airtime fairness-based scheduling can ameliorate this problem so that airtime usage of slow stations is more limited and faster stations can achieve better, e.g., video quality.

Backpressure alleviation could also or instead be implemented at the TID queuing engine 220, discussed later, when determining whether to enqueue a packet in an appropriate one of the TID queues 206. In such an implementation, the backpressure alleviation engine 214 can selectively drop multicast-to-unicast converted packets that do not have space on the TID queues 206. (Unicast packets can also be selectively dropped, or handled in some other manner.)

Advantageously, the backpressure alleviation engine 214 enables consideration of TID scheduling from a Wi-Fi native layer, rather than an abstract IEEE 802 generic MAC and mostly focused on IP layer. This provides fine QoS control logic. For example, the backpressure alleviation engine 214 provides insight into how multicast-to-unicast converted video packets will be scheduled in a Wi-Fi native layer.

In the example of FIG. 2, the 802.3-to-802.11 encapsulation engine 216 is coupled to the dummy scheduler 212. As is well-known in the relevant art, IEEE 802.3 is a working group and a collection of IEEE standards produced by the working group defining the physical layer and data link layer's media access control (MAC) of wired Ethernet. This is generally a local area network technology with some wide area network applications. Physical connections are typically made between nodes and/or infrastructure devices (hubs, switches, routers) by various types of copper or fiber cable. IEEE 802.3 is a technology that supports the IEEE 802.1 network architecture. As is well-known in the relevant art, IEEE 802.11 is a working group and collection of standards for implementing WLAN computer communication in the 2.4, 3.6 and 5 GHz frequency bands. The base version of the standard IEEE 802.11-2007 has had subsequent amendments. These standards provide the basis for wireless network products using the Wi-Fi brand. Obviously, the example of FIG. 2 is intended to illustrate a specific implementation that involves 802.3-compatible packets in the multicast queue 202 and converts via encapsulation to 802.11-compatible packets for enqueuing on the TID queues 206.

In the example of FIG. 2, the multicast-to-unicast conversion engine 218 is coupled to the 802.3-to-802.11 encapsulation engine 216. The engines 216, 218 can be logically or physically combined to form a single "encapsulation and conversion-to-unicast engine." Conversion from multicast-to-unicast can entail changing values in a header. In the example of FIG. 2, the changes would be to an 802.11-compatible header. In a specific implementation, converting a multicast packet to a unicast packet involves changing a group address in the header of the multicast packet to a unicast MAC address (or some other unicast address), which converts the multicast packet to a unicast packet that is bound for the client having the MAC address. In order to generate unicast packets for each client that is part of the group (or a set of clients downstream from a given network device that are part of the group), the multicast-to-unicast conversion engine 216 generates a set of copies of the multicast packet for a corresponding set of clients, and converts the set of copies of the multicast packet to unicast packets that include a destination for the corresponding client (or a destination sufficient to enable the system to get the unicast packet to the client).

In the example of FIG. 2, the TID queuing engine 220 is coupled to the multicast-to-unicast conversion engine 218. The TID queuing engine 220 enqueues packets in the TID queues 206 in accordance with the client and priority associated with the TID queues. The TID queuing engine 220 enqueues packets in the TID queues 206 explicitly, implicitly, or otherwise allowed by the buffer fairness enforcement engine 222.

In the example of FIG. 2, the buffer fairness enforcement engine 222 is coupled to the TID queuing engine 220. In a specific implementation, the buffer fairness enforcement engine 222 instructs the TID queuing engine 220 to selectively drop multicast-to-unicast converted packets for certain clients. Fast stations will tend to have small TID queue length and slow stations will tend to have large TID queue length. If a station meets the limit, it does not attend multicast-to-unicast conversion even if it is in the group, implicitly resulting in a dropped packet. This can be referred to as a "multicast-to-unicast conversion (MC) drop."

MC drops can prevent slow stations from using an unfair amount of buffer resources thereby enabling fast stations to utilize their assigned fair share of airtime (or throughput). In a specific implementation, the buffer fairness enforcement engine 222 enables airtime (or throughput) fairness among multiple stations receiving the same multicast video stream. Advantageously, the buffer fairness enforcement engine 222 can take into account the importance of Wi-Fi native transmission buffer allocation, which can be associated with limited resources, particularly for system on chip (SoC) implementations. When ignored, slow stations can hog transmission buffer resources and block fast stations to break IP QoS.

In a specific implementation, the buffer fairness enforcement engine 222 limits buffer resources per station based upon buffer resources currently available. In a specific implementation, each station is initially (perhaps conceptually) allocated $I=T/S$, where I is transmit buffer resources initially allocated to each station, T is total available buffer resources, and S is the number of transmit-active stations. Advantageously, the buffer fairness enforcement engine 222 can allow sharing of buffer resources without reducing performance from slow stations hogging resources. In a specific implementation, the buffer fairness enforcement engine 222 increases the buffer resources available in accordance with the equation $M=C A/S$, where M is the maximum buffer resources that can be allocated per station, C is a constant, A is the number of buffer resources currently available, and S is the number of transmit-active stations. C can be set to a value that has been empirically shown to be effective, such as 10. Alternatively, C can be replaced with a variable, V, that is adjustable based upon the characteristics of current or predicted traffic. In a specific implementation, $A/T$ can have a floor of 0.2 and/or M can be ignored if $A/T$ is greater than 0.8 (for unlimited buffer resource sharing). This can be referred to as establishing a floor and/or unlimiting a ceiling for an available-to-total transmit buffer ratio. M can also be established more chunkily by, for example, rounding or truncating $A/T$ to the nearest 0.1, 0.2, or some other value. This can be referred to as discretely segmenting an available-to-total transmit buffer ratio. (Note: $M=C(A/T)(T/S)=C A/S$; or $M=V(A/T)(T/S)=V A/S$.)

To illustrate this concept for C=10 (or V=10), an $A/T$ floor of 0.2 and chunkiness of 0.2, assume T=512; so each station is initially (perhaps conceptually) allocated 512/S buffers. Because T=512 is total buffer resources and $A/T$ floor is 0.2, it follows that for A<100 (approximate), A can be treated as 100, and $M \approx 1000/S$ (or $M=512/S*2$). Due to the chunkiness of 0.2 in this example, M can also equal $M=512/S*4$, $M=512/S*6$, $M=512/S*8$, or $M=512/S*10$.

In the example of FIG. 2, the TID queues 206 are coupled to the TID queuing engine 220 of the backpressure-sensitive scheduling engine 204. The TID queues 206 can be similar to the TID queues 120 (FIG. 1).

In the example of FIG. 2, the AC scheduling and frame aggregation engine 208 is coupled to the TID queues 206. The AC scheduling and frame aggregation engine 208 includes a TID-to-AC scheduling engine 224, a token bucket management engine 226, token bucket datastores 228-1 to 228-N (collectively referred to as token bucket datastores 228), a token refresh engine 230, and a frame aggregation engine 232.

In the example of FIG. 2, the TID-to-AC scheduling engine 224 is coupled to the TID queues 206. The TID-to-AC scheduling engine 224 dequeues packets from the TID queues 206 for AC scheduling. Slow or marginal Wi-Fi stations can use up Wi-Fi hardware transmit buffers and/or airtime to the detriment of other stations, even stations that have the capability to achieve good playback quality if resources were fairly allocated. Moreover, global fairness cannot be achieved for airtime in Wi-Fi when slow stations have packets queued for sending and fast stations have none, which triggers frequent token reissuing for slow stations to steal away airtime share. Airtime (or throughput) fairness targets each station to utilize equal shares of airtime (or throughput). The TID-to-AC scheduling engine 224 ameliorates the inherent unfairness of, e.g., a straight-forward round-robin scheduling algorithm with the use of an implemented token-restricted round-robin algorithm.

In the example of FIG. 2, the token bucket management engine 226 is coupled to the TID-to-AC scheduling engine 224. The token bucket management engine 226 provides the TID-to-AC scheduling engine 224 instructions to enable the TID-to-AC scheduling engine 224 to schedule packets in accordance with an implemented token-restricted round-robin algorithm.

In the example of FIG. 2, the token buckets 228, which respectively correspond to the TID queues 206, are coupled to the token bucket management engine 226. Alternatively, the token buckets 228 can correspond to subpluralities of the TID queues 206 (e.g., one token bucket per station where a station has multiple associated TID queues, such as one TID queue per priority class). In a relatively simplistic implementation, the token buckets 228 store a token balance for the corresponding TID queues 206. The token buckets 228 can be implemented as a datastore for storing a value representative of an unused airtime (or throughput) share. The token buckets 228 can have minimum values (floors), which can include zero or negative values, and/or maximum values (ceilings).

Depending upon the context, it may be useful to refer to certain terms, such as "token surplus," "no token balance," and "token deficit." For illustrative convenience, no token balance is indicative of a lower threshold at which no tokens are available for a relevant traffic flow, and may be referred to as zero with the understanding that some other number could be representative of no token balance. For illustrative convenience, a token surplus is indicative of one or more tokens more than no token balance, and may be referred to as a positive number of tokens greater than zero with the understanding that alternative numbering schemes could be used (e.g., a token surplus could be any number greater than some arbitrary number, such as −5 or 20; or token surplus could be ordinally smaller than no token balance by switching from an incremental to decremental system). For illustrative convenience, a token deficit is some amount of tokens less than no token balance, and may be referred to as a negative number of tokens with the understanding that alternative numbering schemes could be used. Token deficits may or may not be allowed, depending upon implementation- or configuration-specific factors.

In a specific implementation, the token bucket management engine 226 initializes the token buckets 228 to an initial value. The initial value can be a positive number, where the number represents an applicable unit of measure (e.g., bytes, seconds, a ratio, etc.). Token buckets can be incremented from time to time by an increment value. A scheduling weight may or may not be used to modify the size of the initial and/or increment value. The scheduling weight can depend upon, for example, characteristics of corresponding TID queue(s), characteristics of other TID queues, characteristics of a station with which a token bucket is associated, characteristics of a network (such as performance), etc.

In a specific implementation, the token bucket management engine 226 carries out a token bucket checking cycle. For illustrative purposes, the token bucket 228-1 is treated as the first in a token bucket checking cycle, and 228-N is treated as the last. In an alternative, there can be multiple token bucket checking cycles that operate in parallel (e.g., one for each priority class). Over the course of a token bucket checking cycle, the token bucket management engine 226 can increment the values in the token buckets 228. (Initialization can occur in an initialization cycle, or can instead, depending upon the implementation, occur in a token bucket checking cycle.)

In a specific implementation, in a token bucket checking cycle, the token bucket management engine 226 determines whether a token balance for a token bucket 228-1 is at an allowable threshold. In a specific implementation, an allowable threshold value can be the same as the initial value, a value lower than the initial value, when the token bucket 228-1 has a token surplus, etc. If the token bucket 228-1 is at an allowable threshold, the token bucket management engine 226 gives the TID-to-AC scheduling engine 224 permission to dequeue and schedule one or more packets from the TID queue 206-1.

In a specific implementation, each packet has an associated token cost. A token cost can be indicative of resources used to transmit the packets (e.g., based on packet size, time to transmit, etc.). When the TID-to-AC scheduling engine 224 dequeues a packet from the TID queue 206-1, the token bucket management engine 226 deducts an appropriate token cost from the balance of the token bucket 228-1. Alternatively, the token cost can be determined and/or deducted at a later time (e.g., in the frame aggregation engine 230 or in the wi-fi radio 210, with feedback to the token bucket management engine 226 to carry out the deduction). In a specific implementation, the token cost may be deducted even if the deduction results in the token balance being reduced to below zero (or an equivalent value indicative of the floor at which dequeuing a packet is not allowed). In essence, a flow with a token balance (i.e., a token balance greater than a "no token balance" amount) can send a packet "on credit" even if the packet is sufficiently large that it has greater token cost than token balance. In a specific implementation, the token bucket management engine 226 can deduct an estimated token cost for a packet, and later adjust the relevant token bucket balance after measuring resources consumed in the transmission of the packet at a later time. (In the case of uplink traffic, token cost may be known beforehand, obviating the need for an estimate.)

In the example of FIG. 2, the token refresh engine 230 is coupled to the token buckets 228. The TID-to-AC scheduling engine 224 and token bucket management engine 226 can carry out the token bucket checking cycle as described in the preceding several paragraphs for each of the TID queues 206 and token buckets 228. After one or more token bucket checking cycles, the token refresh engine 230 can increment each of the token buckets 228 by an increment value. The token refresh engine 230 can increment each of the token buckets 228 in a refresh cycle that runs in parallel with the token bucket checking cycle, incrementing token buckets after they are checked. In such a case, the token buckets can be incremented after every time the token buckets are checked or a fraction of the times the token buckets are checked (e.g., once every 2 or more times a token bucket checking cycle iterates). Alternatively to parallel execution, the token refresh engine 230 can carry out the token bucket refresh cycles intermittently with the token bucket checking cycles. The token refresh engine 230 can carry out token bucket refresh cycles in accordance with a timer and/or can be reactive to environmental factors, such as network congestion. Depending upon the implementation, the token bucket checking cycle and token bucket refresh cycles can be considered aspects of a single token bucket management cycle.

By employing the token bucket checking cycle and the token bucket refresh cycle, the token bucket management engine 226 provides instructions to the TID-to-AC scheduling engine 224 to dequeue packets for traffic flows that are currently permitted to send, and eventually allows all traffic flows to send as token buckets that run out of tokens are replenished. Of course, if a traffic flow is sufficiently delayed, it can result in drops, which means even though token buckets are refreshed, the token buckets may not be refreshed with sufficient speed to ensure that all packets bound for a station are actually sent.

In the example of FIG. 2, the Wi-Fi radio 210 is coupled to the frame aggregation engine 232 of the AC scheduling and frame aggregation engine 208. The frame aggregation engine 232 receives frames from the TID-to-AC scheduling engine 224, aggregates them appropriately, and provides the aggregated frames to the Wi-Fi radio 210 for transmission via a wireless network.

Figure 3:
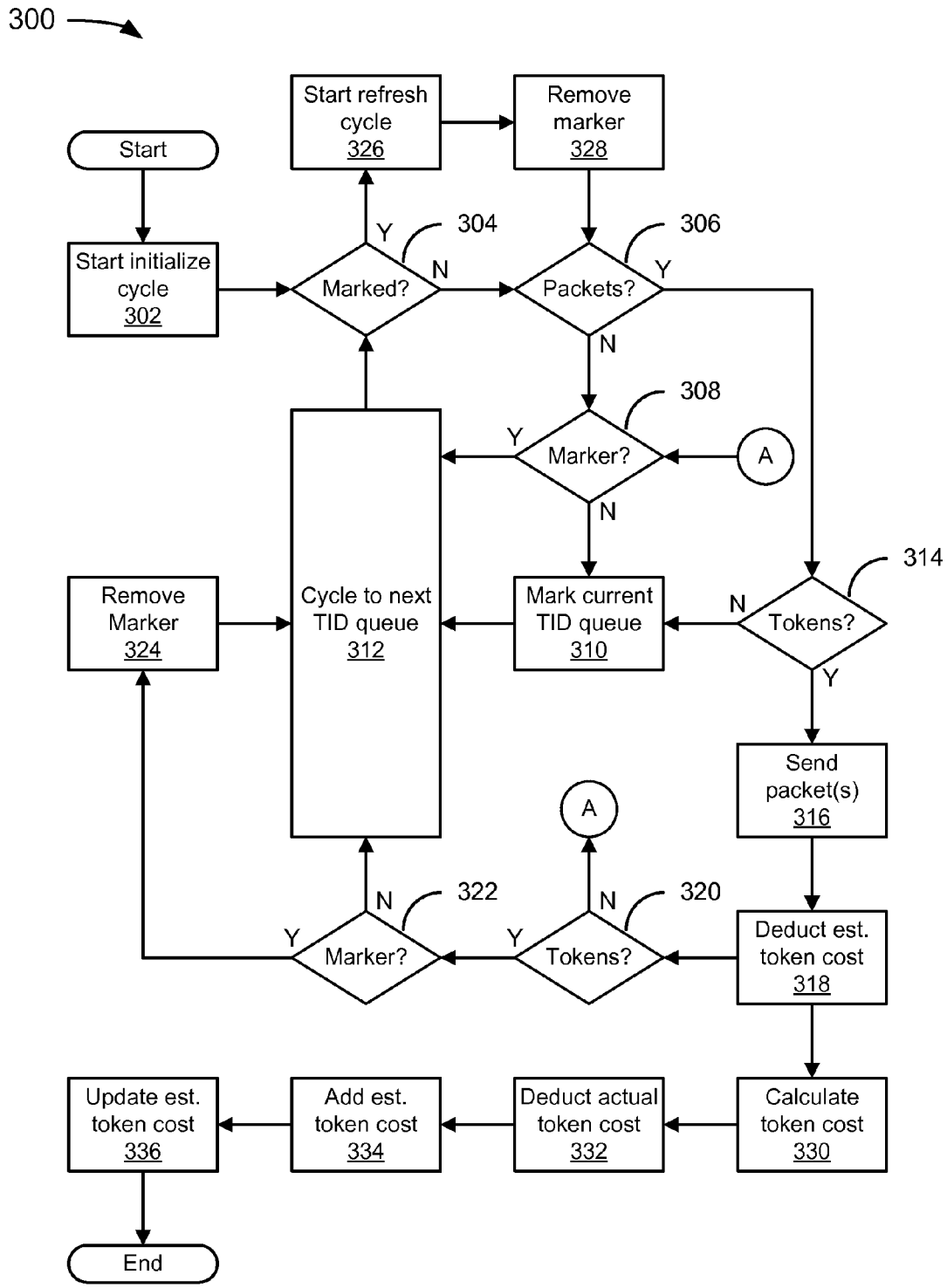
FIG. 3 depicts a flowchart of an example of a method for carrying out a token bucket check for ensuring packet transmission fairness.

FIG. 3 depicts a flowchart 300 of an example of a method for carrying out a token bucket check for ensuring packet transmission fairness. In the example of FIG. 3, the flowchart 300 starts at module 302 where an initialization cycle is started. The initialization cycle adds an initial value to each token bucket that is to be part of a token bucket checking cycle or sets each token bucket to the initial value. The initialization cycle need not be explicit (e.g., the token buckets could start with a value of 0 without an explicit initialization cycle to cycle through each of the token buckets in turn). The initial value need not be the same for each TID queue (e.g., some TID queues could have larger associated initial and refresh values than other TID queues).

In the example of FIG. 3, the flowchart 300 continues to decision point 304 where it is determined whether a currently considered TID queue is marked. A TID queue is marked if it runs out of tokens (e.g., if the TID queue has a token deficit). If the TID queue under consideration is marked, that signifies that a token bucket checking cycle has cycled through each applicable TID queue and returned to a TID queue that previously had insufficient tokens and was, therefore, marked. For this reason, the marker can be referred to as an "insufficient tokens indicator" for the TID queue. Depending upon the implementation, the marker can be a Boolean value (true or false) or a Boolean expression (e.g., token balance <0), or some other value or function that provides the applicable status of the TID queue. As will be indicated later in the flowchart 300, if a marker survives until the token bucket checking cycle returns to the TID queue associated with the marker, a refresh cycle is needed because that means none of the TID queues have sufficient tokens.

If it is determined that the currently considered TID queue is not marked (304-N), then the flowchart 300 continues to decision point 306 where it is determined whether the currently considered TID queue has packets to send. If it is determined that the currently considered TID queue has no packets to send (306-N), then the flowchart 300 continues to decision point 308 where it is determined whether any TID queue in the token bucket checking cycle has a marker. If it is determined that no TID queue in the token bucket checking cycle has a marker (308-N), then the flowchart 300 continues to module 310 where the currently considered TID queue is marked, to module 312 where the token bucket checking cycle cycles to the next TID queue, and returns to decision point 304 to continue as described previously for a next TID queue.

If, on the other hand, it is determined that a TID queue in the token bucket checking cycle has a marker (308-Y), then the flowchart continues to module 312 as just described (but skipping module 310). Thus, if a TID queue has no packets to send and no other TID queue has been marked, the TID queue is marked, but if the TID queue has no packets to send and some other TID queue has been marked, the currently considered TID queue is not marked. In the latter case, marking the currently considered TID queue would be redundant because if the token bucket checking cycle reaches the previously marked TID queue (which it will do before reaching the currently considered TID queue again), then a refresh cycle will start to refresh all TID queues, including the currently considered TID queue. In an alternative, the flowchart 300 could simply mark any TID queue that has no packets, regardless of the status of other TID queues. This has the advantage of requiring no status checking, but the disadvantage of unnecessarily marking a TID queue and needing to clear the mark during the refresh cycle. On the other hand, if a periodic refresh cycle is implemented in addition to the as-needed refresh cycle of the example of FIG. 3, it may or may not be desirable to mark any TID queue that has a token deficit and clear the marker when either the periodic or as-needed refresh cycle reaches the marked TID queue.

Referring once again to decision point 306, if it is determined that the currently considered TID queue has packets to send (306-Y), then the flowchart 300 continues to decision point 314 where it is determined whether the currently considered TID queue has a positive token balance (e.g., zero or a surplus). If it is determined that the currently considered TID queue does not have a positive token balance (314-N), then the flowchart 300 returns to module 310 and continues as described previously.

If, on the other hand, it is determined that the currently considered TID queue has a positive token balance (314-Y), then the flowchart 300 continues to module 316 with sending packets. In a specific implementation, packets can be sent for any token balance (even if the token balance is zero), and token costs for sending the packets can result in a token deficit corresponding to the size of the token cost over the token balance. Depending upon the implementation, the token cost of sending packets can be calculated in advance, determined as the packets are sent, or both (redundantly).

In the example of FIG. 3, the flowchart 300 continues to module 318 where a token cost for sending the packets is deducted from the token bucket balance. The determination of how many packets to send can be intermingled with the determination of token costs, and estimated token costs can be corrected later when actual token costs become known. For example, token costs can be deducted as packets are dequeued, based upon the size of the packets. When the token cost reaches a maximum allowed share in the token bucket checking cycle or when the token cost results in a token bucket deficit, no additional packets are dequeued for the currently considered TID queue in the current cycle.

In the example of FIG. 3, the flowchart 300 continues to decision point 320 where it is determined whether the currently considered TID queue still has tokens (after sending packets). If the currently considered TID queue does not still have tokens (320-N), then the flowchart 300 returns to decision point 308 and continues as described previously. If, on the other hand, the TID queue still has tokens (320-Y), then the flowchart 300 continues to decision point 322 where it is determined whether any TID queue in the token bucket checking cycle has a marker. If it is determined that no TID queue in the token bucket checking cycle has a marker (322-N), then the flowchart 300 returns to module 312 and continues as described previously.

If, on the other hand, it is determined that a TID queue in the token bucket checking cycle has a marker (322-Y), then the flowchart 300 continues to module 324 where the marker is removed, and returns to module 312 to continue as described previously. By removing the marker, the token bucket checking cycle will not enter an as-needed refresh cycle simply because it reaches a TID queue with a token deficit. Rather, the token bucket checking cycle will return to the currently considered TID queue to let the currently considered TID queue use up its positive token balance.

Referring once again to decision point 304, if it is determined that the currently considered TID queue is marked, then the flowchart 300 continues to module 326 where a refresh cycle is started. In a specific implementation, an increment value (number of tokens) is added to the token bucket associated with the currently considered TID queue. If the currently considered TID queue has a token deficit (which expected given the progress of the flowchart 300 to this point), the token balance after refresh will be smaller than the increment value.

In the example of FIG. 3, the flowchart 300 continues to module 328 where the marker is removed from the currently considered TID queue. Depending upon the implementation, it is at least theoretically possible for a refresh to be inadequate to eliminate the deficit entirely. In such a case, the logic of the flowchart 300 re-marks the currently considered TID queue (310). Alternatively, the marker could be left, rather than removed, at module 328.

In the example of FIG. 3, the flowchart 300 returns to decision point 306 to continue as described previously. After the refresh cycle has been started, after the flowchart 300 returns to module 312 until reaching the TID queue at which the refresh cycle started, the token bucket for the next TID queue can be incremented by the increment value. Alternatively, the refresh cycle can run independently of the token bucket checking cycle, refreshing token buckets at a different pace (e.g., faster, slower, or sometimes faster, sometimes slower). In a specific implementation, a periodic refresh cycle can be running alongside the refresh cycle that is triggered when the token bucket checking cycle returns to a marked queue. The periodic refresh cycle can "top off" token buckets that do not necessarily need additional tokens. If there is a periodic refresh cycle and an as-needed refresh cycle, the cycles can be referred to as such to distinguish; otherwise, context should dictate the type of refresh cycle that is used.

Referring once again to module 318, the flowchart 300 can continue along an alternative path to module 330 where actual token cost is calculated. The alternative path can be taken in parallel to other paths in the example of FIG. 3. The alternative path can be referred to as a token cost adjustment path (or cycle). In a wireless context, the token cost adjustment can be an airtime token cost adjustment. That is, the amount of airtime used is calculated and an actual token cost is determined in accordance with the calculation.

In the example of FIG. 3, on the token cost adjustment path, the flowchart 300 continues to module 332 where actual token cost is deducted from the relevant TID queue. (It may be noted that at a given time, it is not clear what TID queue is being considered in the token bucket checking cycle, but the token cost adjustment is for the TID queue that was currently being considered at module 318.)

In the example of FIG. 3, on the token cost adjustment path, the flowchart 300 continues to module 334 where estimated token cost is added to the relevant TID queue. In this way, the relevant token bucket from which an estimated token cost was previously deducted is adjusted after the fact to instead deduct the actual token cost. Obviously, the order of modules 332 and 334 are not particularly relevant and can be combined (e.g., by adding estimated token cost minus actual token cost to the relevant TID queue).

In the example of FIG. 3, on the token cost adjustment path, the flowchart 300 ends at module 336 where estimated token cost of future transmission is updated to reflect the actual token cost for the just-considered transmission. In this way, the estimated token cost deducted at (future) module 318 can use the latest transmission cost.

Figure 4:
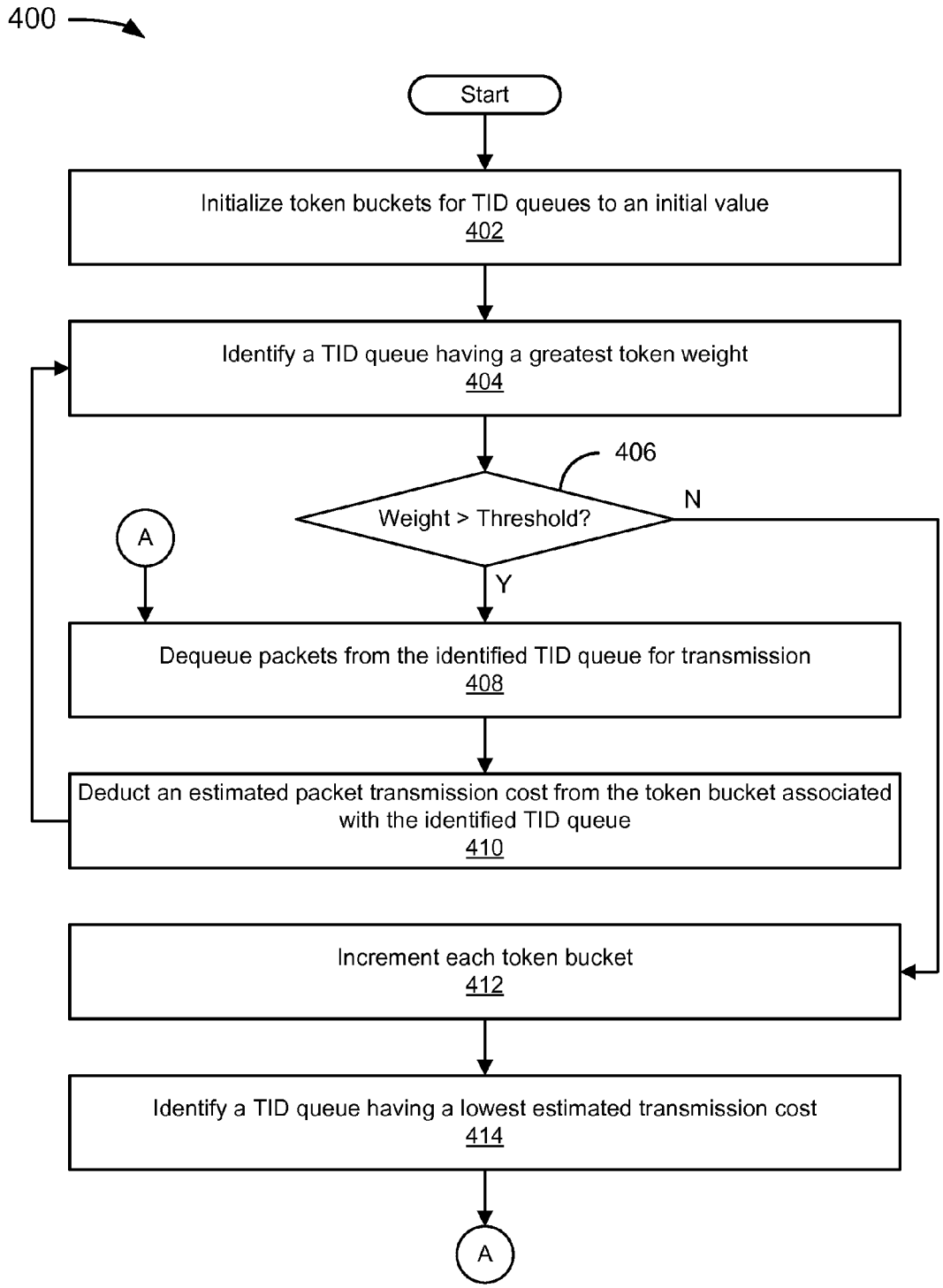
FIG. 4 depicts a flowchart of an example of a token-weighted token bucket checking cycle.

In a specific implementation, the token bucket checking cycle is not round-robin. FIG. 4 is intended to illustrate a token-weighted token bucket checking cycle. FIG. 4 depicts a flowchart 400 of an example of a token-weighted token bucket checking cycle. In the example of FIG. 4, the flowchart 400 starts at module 402 with initializing token buckets for TID queues to an initial value.

In the example of FIG. 4, the flowchart 400 continues to module 404 where a TID queue having a greatest token weight is identified. The identification may or may not entail sorting the TID queues by associated token weights. In this example, a token weight can be defined as a number of tokens in a token bucket associated with the TID queue. In a specific implementation, the token weight can be equal to the token balance associated with a TID queue, where a larger token balance is indicative of a greater number of tokens. If token balances are identical for two TID queues, weight can be determined arbitrarily, ordinally, randomly, or using some other function (e.g., a function that weights TID queues with smaller expected token costs greater than TID queues with larger expected token costs).

In the example of FIG. 4, the flowchart 400 continues to decision point 406 where it is determined whether the token weight of the identified TID queue is greater than a token balance threshold. The token balance threshold is a threshold at which it becomes time for a refresh cycle. If it is determined that the token weight of the identified TID queue is greater than a token balance threshold (406-Y), then the flowchart 400 continues to module 408 where packets from the identified TID queue are dequeued for transmission.

In the example of FIG. 4, the flowchart 400 continues to module 410 where the identified TID queue has an estimated packet transmission cost deducted from its associated token bucket. The estimated packet transmission cost can be based upon, for example, a last measured packet transmission cost, a weighted average of previously measured packet transmission costs (with the most recent being the most heavily weighted), or some other basis that is determined to be likely to provide a good estimate.

In the example of FIG. 4, the flowchart 400 returns to module 404 to continue as described previously.

Referring once again to decision point 406, if it is determined that the token weight of the identified TID queue is not greater than a token balance threshold, then the flowchart 400 continues to module 412 where each token bucket is incremented. The reason for the increment is that the TID queue with the greatest weight does not have what has been determined to be a sufficient token bucket balance. Following (or during) the refresh cycle, the token bucket checking cycle can continue as described previously. However, in order to minimize latency, an optional technique can be used as follows (the alternative would be for the flowchart to return to module 404 after module 412).

In the example of FIG. 400, the flowchart 400 continues to module 414 where a TID queue with a lowest estimated transmission cost is identified and returns to module 408 to continue as described previously (but with the identified queue being the TID queue with the lowest estimated transmission cost).

Figure 5:
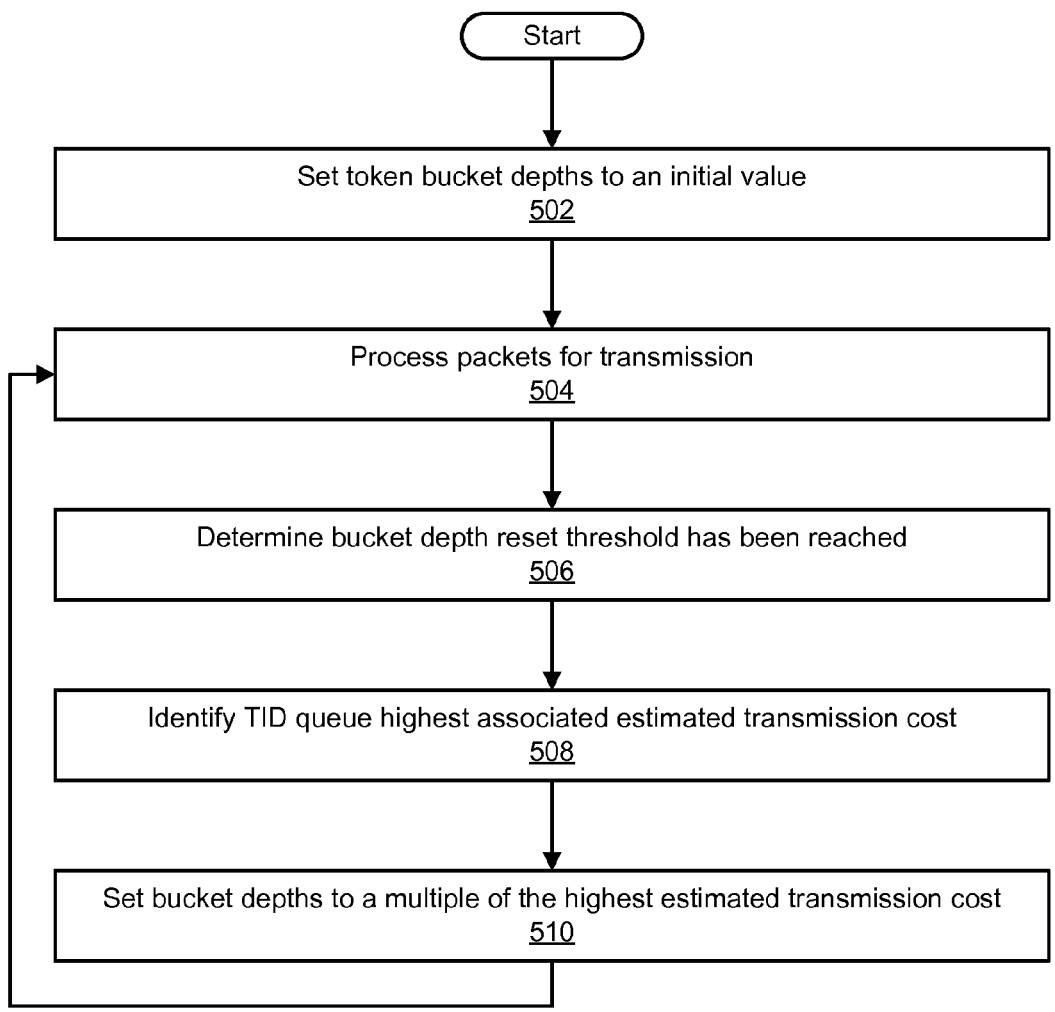
FIG. 5 depicts a flowchart of an example of a method for dynamically adjusting bucket depth.

To this point, bucket depth has been treated as a static value, but in a specific implementation, the bucket depth has a dynamic value. Bucket depth defines how sensitive fairness can be implemented. FIG. 5 depicts a flowchart 500 of an example of a method for dynamically adjusting bucket depth. In the example of FIG. 5, the flowchart 500 starts at module 502 where token bucket depths for TID queues are set to an initial value. The initial value can be arbitrary, predetermined, based upon historical data, or established in some other manner.

In the example of FIG. 5, the flowchart 500 continues to module 504 where packets are processed for transmission. The manner in which packets are processed can be in accordance with techniques described previously in this paper and/or one or more of such techniques combined with known or convenient techniques.

In the example of FIG. 5, the flowchart 500 continues to module 506 where it is determined that a bucket depth reset threshold has been reached. The bucket depth reset threshold can be based upon time, number of cycles, network conditions, etc., and can differ depending upon the circumstances. An example of different threshold units is in an example where the bucket depth reset threshold is set to a single cycle of a token bucket checking cycle after the token bucket depths are initialized (e.g., at module 502), then based upon a period of time thereafter. An example of different threshold values is an example where the bucket depth reset threshold is set to one minute, but the period is reduced if there are a large number of wireless connections made over a period of time (in a wireless embodiment). Of course, the bucket depth reset threshold can also be consistent (e.g., the threshold can be reached every 60 seconds).

In the example of FIG. 5, the flowchart 500 continues to module 508 where a TID queue with a highest associated estimated transmission cost is identified. Slower stations will tend to have higher estimated transmission costs than faster stations. However, stations come and go in certain implementations, making the highest estimated transmission cost vary over time.

In the example of FIG. 5, the flowchart 500 continues to module 510 where bucket depths are set to a multiple of the highest estimated transmission cost. It has been found that a bucket depth of some size greater than the transmission cost is desirable. Accordingly, the multiple can be set to some relatively low integer value (e.g., 2). The multiple need not be adjusted, but if it were a variable, it could be adjusted for a number of reasons, including ensuring bucket depths do not drop too low, which could conceivably cause problems for a very slow station that connects to a wireless network that has only very fast stations.

As used herein, a wireless network refers to any type of wireless network, including but not limited to a structured network or an ad hoc network. Data on a wireless network is often encrypted. However, data may also be sent in the clear, if desired. With encrypted data, a rogue device will have a very difficult time learning any information (such as passwords, etc.) from clients before countermeasures are taken to deal with the rogue. The rogue may be able to confuse the client, and perhaps obtain some encrypted data, but the risk is minimal (even less than for some wired networks).

As used herein, the term "embodiment" means an embodiment that serves to illustrate by way of example but not limitation. The techniques described in the preceding text and figures can be mixed and matched as circumstances demand to produce alternative embodiments.

We claim:

1. A method comprising:
   identifying a subplurality of traffic identifier (TID) queues associated with a multicast packet;
   converting the multicast packet into a multicast-to-unicast converted unicast packet for the subplurality of TID queues;
   enqueueing the multicast-to-unicast converted unicast packet in available TID queues of the subplurality of TID queues, wherein availability of the subplurality of TID queues is based on an amount of unused space in each TID queue of the subplurality of TID queues;
   dequeueing the multicast-to-unicast converted unicast packet from a TID queue of the available TID queues according to a token bucket checking cycle applied to the subplurality of TID queues;
   transmitting the multicast-to-unicast converted unicast packet to a destination.

2. The method of claim 1, wherein dequeueing the multicast-to-unicast converted unicast packet from the TID queue of the available TID queues according to a token bucket checking cycle further comprises:
   determining whether a token weight of the TID queue is greater than a token balance threshold of the TID queue;
   determining whether to dequeue the multicast-to-unicast converted unicast packet from the TID queue based on the determination whether the token weight of the TID queue is greater than the token balance threshold of the TID queue.

3. The method of claim 2, wherein if it is determined that the token weight of the TID queue is greater than the token balance threshold of the TID queue, the method further comprises dequeueing the multicast-to-unicast converted unicast packet from the TID queue.

4. The method of claim 2, wherein if it is determined that the token weight of the TID queue is less than the token balance threshold of the TID queue, the method further comprises incrementing token buckets associated with the subplurality of TID queues.

5. The method of claim 1, wherein a token bucket associated with the TID queue has a token weight greater than token weights of token buckets associated with the subplurality of TID queues.

6. The method of claim 1, wherein the TID queue has a lowest estimated transmission cost of the subplurality of TID queues.

7. The method of claim 6, wherein estimated transmission costs of the subplurality of TID queues is determined based on an estimated airtime of transmitting packets in the subplurality of TID queues.

8. The method of claim 7, wherein the estimated airtime of transmitting packets in the subplurality of TID queues is determined based on airtime required to transmit previous packets to a same client.

9. The method of claim 7, wherein the estimated airtime of transmitting packets in the subplurality of TID queues is determined based on clients assigned to the same QoS profile associated with the packets.

10. The method of claim 7, wherein the estimated airtime of transmitting packets in the subplurality of TID queues is determined based on clients assigned to the same QoS profile associated with the packets and a size of the packets.

11. A system comprising:
a backpressure alleviation engine configured to identify a subplurality of traffic identifier (TID) queues associated with a multicast packet;
a multicast-to-unicast conversion engine configured to convert the multicast packet into a multicast-to-unicast converted unicast packet for the subplurality of TID queues;
a TID queuing engine configured to enqueue the multicast-to-unicast converted unicast packet in available TID queues of the subplurality of TID queues, availability of the subplurality of TID queues based on an amount of unused space in each TID queue of the subplurality of TID queues;
a TID-to-Access Category (AC) scheduling engine configured to dequeue the multicast-to-unicast converted unicast packet from a TID queue of the available TID queues according to a token bucket checking cycle applied to the subplurality of TID queues;
a medium interface configured to transmit the multicast-to-unicast converted unicast packet to a destination.

12. The system of claim 11, wherein in dequeueing the multicast-to-unicast converted unicast packet from the TID queue of the available TID queues according to a token bucket checking cycle, the TID-to-AC scheduling engine is further configured to:
determine whether a token weight of the TID queue is greater than a token balance threshold of the TID queue;
determine whether to dequeue the multicast-to-unicast converted unicast packet from the TID queue based on the determination whether the token weight of the TID queue is greater than the token balance threshold of the TID queue.

13. The system of claim 12, wherein the TID-to-AC scheduling engine is further configured to dequeue the multicast-to-unicast converted unicast packet from the TID queue, if it is determined that the token weight of the TID queue is greater than the token balance threshold of the TID queue.

14. The system of claim 12, wherein the TID-to-AC scheduling engine is further configured to increment token buckets associated with the subplurality of TID queues if it is determined that the token weight of the TID queue is less than the token balance threshold of the TID queue.

15. The system of claim 11, wherein a token bucket associated with the TID queue has a token weight greater than token weights of token buckets associated with the subplurality of TID queues.

16. The system of claim 11, wherein the TID queue has a lowest estimated transmission cost of the subplurality of TID queues.

17. The system of claim 16, wherein estimated transmission costs of the subplurality of TID queues is determined based on an estimated airtime of transmitting packets in the subplurality of TID queues.

18. The system of claim 17, wherein the estimated airtime of transmitting packets in the subplurality of TID queues is determined based on airtime required to transmit previous packets to a same client.

19. The system of claim 17, wherein the estimated airtime of transmitting packets in the subplurality of TID queues is determined based on clients assigned to the same QoS profile associated with the packets.

20. The system of claim 17, wherein the estimated airtime of transmitting packets in the subplurality of TID queues is determined based on clients assigned to the same QoS profile associated with the packets and a size of the packets.

21. A system comprising:
means for identifying a subplurality of traffic identifier (TID) queues associated with a multicast packet;
means for converting the multicast packet into a multicast-to-unicast converted unicast packet for the subplurality of TID queues;
means for enqueueing the multicast-to-unicast converted unicast packet in available TID queues of the subplurality of TID queues, wherein availability of the subplurality of TID queues is based on an amount of unused space in each TID queue of the subplurality of TID queues;
means for dequeueing the multicast-to-unicast converted unicast packet from a TID queue of the available TID queues according to a token bucket checking cycle applied to the subplurality of TID queues;
means for transmitting the multicast-to-unicast converted unicast packet to a destination.

* * * * *